(12) United States Patent
Huang et al.

(10) Patent No.: US 7,159,996 B2
(45) Date of Patent: Jan. 9, 2007

(54) BACKLIGHT SYSTEM WITH EXCHANGEABLE LIGHT SOURCES AND LIQUID CRYSTAL DISPLAY USING THE SAME

(75) Inventors: Chung-Sung Huang, Miao-Li (TW); Sheng-Ming Wen, Shenzhen (CN)

(73) Assignees: Innocom Technology (Shenzhen) Co., Ltd., Shenzhen (CN); Innolux Display Corp., Miao-Li (TW)

( * ) Notice: Subject to any disclaimer, the term of this patent is extended or adjusted under 35 U.S.C. 154(b) by 89 days.

(21) Appl. No.: 10/871,142

(22) Filed: Jun. 18, 2004

(65) Prior Publication Data

US 2004/0257796 A1 Dec. 23, 2004

(30) Foreign Application Priority Data

Jun. 18, 2003 (TW) .............................. 92116595 A

(51) Int. Cl.
*F21V 14/00* (2006.01)

(52) U.S. Cl. ...................... 362/225; 362/219; 362/224

(58) Field of Classification Search ................ 362/613, 362/625, 633, 219, 634, 223, 225, 247; 349/60
See application file for complete search history.

(56) References Cited

U.S. PATENT DOCUMENTS

| | | | |
|---|---|---|---|
| 5,186,537 A | 2/1993 | Katoh et al. | |
| 5,537,296 A * | 7/1996 | Kimura et al. | 362/634 |
| 5,558,420 A | 9/1996 | Oki et al. | |
| 6,330,150 B1 | 12/2001 | Kim | |
| 6,664,954 B1 * | 12/2003 | Yoshimura et al. | 345/179 |
| 6,857,759 B1 * | 2/2005 | Lee et al. | 362/225 |
| 6,867,825 B1 * | 3/2005 | Kanatsu et al. | 349/60 |
| 6,947,104 B1 * | 9/2005 | Yu et al. | 349/61 |

* cited by examiner

*Primary Examiner*—Renee Luebke
*Assistant Examiner*—Zahra I. Bennett
(74) *Attorney, Agent, or Firm*—Wei Te Chung

(57) ABSTRACT

A backlight system (10) includes a light source (30) having a light emitting portion (31) and a wire (32); and a bracket (20) having a plurality of fastener (24) which holds the light emitting portion thereby mounting the light source on the bracket, the wire are electrically connected with the bracket. The backlight system can stably fix the light sources in the bracket, and it is convenient and safe to exchange the light sources.

11 Claims, 4 Drawing Sheets

BACKLIGHT SYSTEM WITH EXCHANGEABLE LIGHT SOURCES AND LIQUID CRYSTAL DISPLAY USING THE SAME

BACKGROUND OF THE INVENTION

1. Field of the Invention

The present invention relates to an illumination device to be used as a surface light source having uniform brightness; for example, as backlight for a liquid crystal display.

2. Prior Art

A typical LCD device includes a liquid crystal display panel, and a backlight system mounted under the liquid crystal display panel for supplying light beams thereto. The backlight system is generally into one of two types—an upright type or an edge-light type—according to the position in which a lamp is installed in a backlight unit of the backlight system.

In the case of an upright type backlight system, the lamp is installed at a rear portion of the liquid crystal display panel. A light spreading plate and a light reflection plate are installed at front and rear portions of the lamp respectively, so that light beams are directly output onto a liquid crystal display panel.

Referring to FIG. 6, U.S. Pat. No. 6,330,150 issued to Samsung Electronics Co., Ltd. on Dec. 11, 2001 discloses a liquid crystal display module 100 using an upright type backlight system. The liquid crystal display module 100 includes a liquid crystal display panel 110 having a plurality of lamps 130 engaged therein. The liquid crystal display panel 110 is mounted in a panel bracket 120.

The bracket 120 is used to secure a frame of the liquid crystal display panel 110, and the lamp 130 is exchanged by opening and closing a cover (not labeled) of the bracket 120.

The liquid crystal display panel 110 includes an upper surface 111, in which a plurality of rectangular holes 112 is defined. Each lamp 130 is engaged in a corresponding rectangular hole 112.

Each lamp 130 includes a hexagonal head portion (not labeled), a luminous body (not labeled) extending from the head portion, and a rubber plate 131 attached on a lateral surface of the head portion. The rubber plate 131 has a predetermined elasticity. When the lamp 130 is inserted into the rectangular hole 112 of the liquid crystal display panel 70, the rubber plate 131 is elastically compressed and received in the hole 112. Once the lamp 130 has been completely inserted into the hole 112, pressure on the rubber plate 131 is released. The rubber plate 131 expands so that it is resiliently engaged in the hole 112. The lamp 130 is thus fixed at the hole 112 and secured in the liquid crystal display panel 110.

When exchanging the lamp 130, the rubber plate 131 attached at the head portion is compressed and released from the hole 112. The lamp 130 is then slid out from the liquid crystal panel 110.

However, the liquid crystal display module 100 has certain disadvantages. First, each lamp 130 is engaged in a corresponding rectangular hole 112 of the liquid crystal display panel 110. During engagement and removal of the lamp 130, the lamp 130 is liable to abrade an edge of the liquid crystal display panel 110 at the hole 112 and thereby sustain damage. Second, only one rubber plate 131 is used to fix each lamp 130 in the liquid crystal panel 110. This engagement may not be secure, particularly if the LCD module 100 is subjected to vibration or shock during use or transportation.

Therefore, it is desirable to provide a backlight system which overcomes the above-described disadvantages of conventional backlight systems.

SUMMARY OF THE INVENTION

An object of the present invention is to provide a backlight system that is capable of having light sources thereof easily and safely exchanged.

In order to achieve the above-mentioned object, a backlight system in accordance with the present invention includes a light source, defining a light emitting portion and a wire; and a bracket includes a fastening means which holds the light emitting portion thereby mounting the light source on the bracket, the wire being electrically connected with the bracket.

Other objects, advantages, and novel features of the present invention will become more apparent from the following detailed description when taken in conjunction with the accompanying drawings, in which:

DETAILED DESCRIPTION OF THE PRESENT INVENTION

Figure 1:
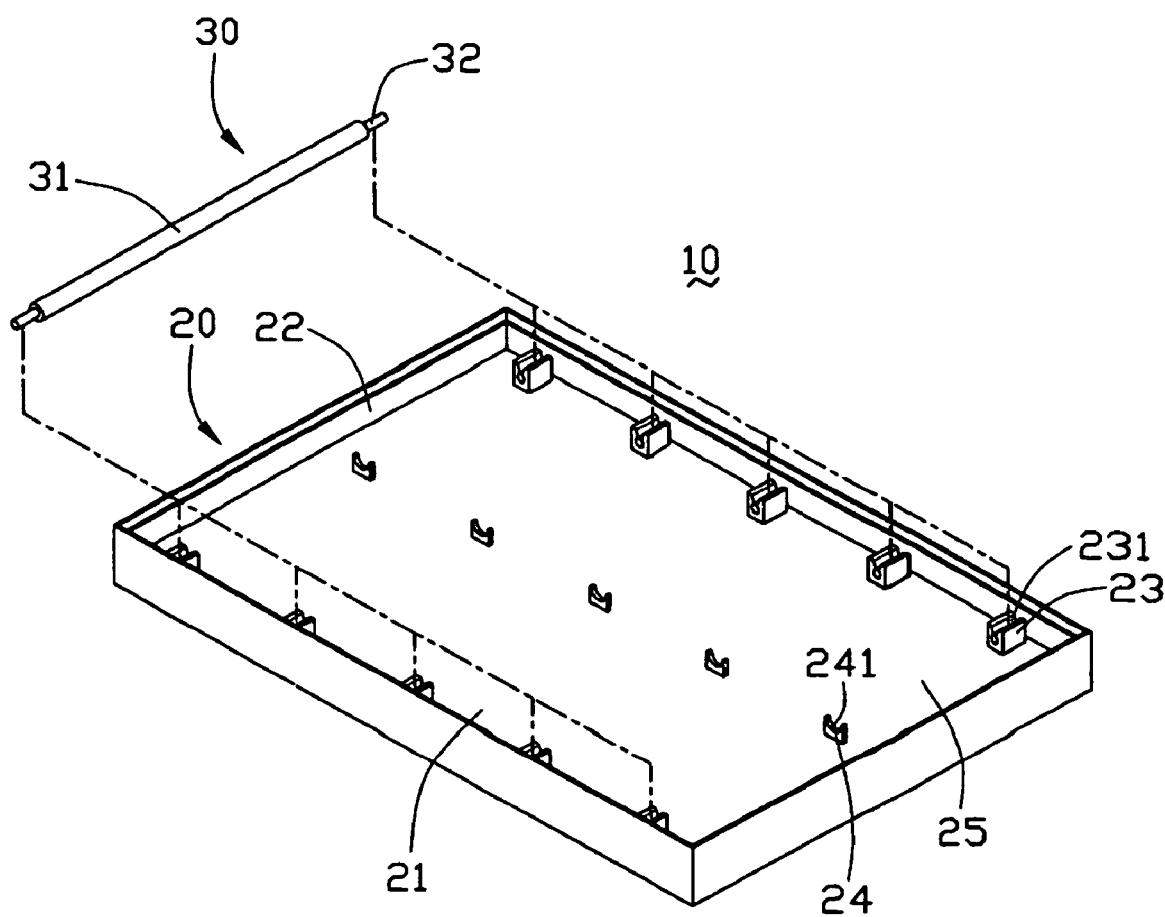
FIG. 1 is an exploded, isometric view of a backlight system in accordance with a preferred embodiment of the present invention, but showing only one light source thereof.
Figure 2:
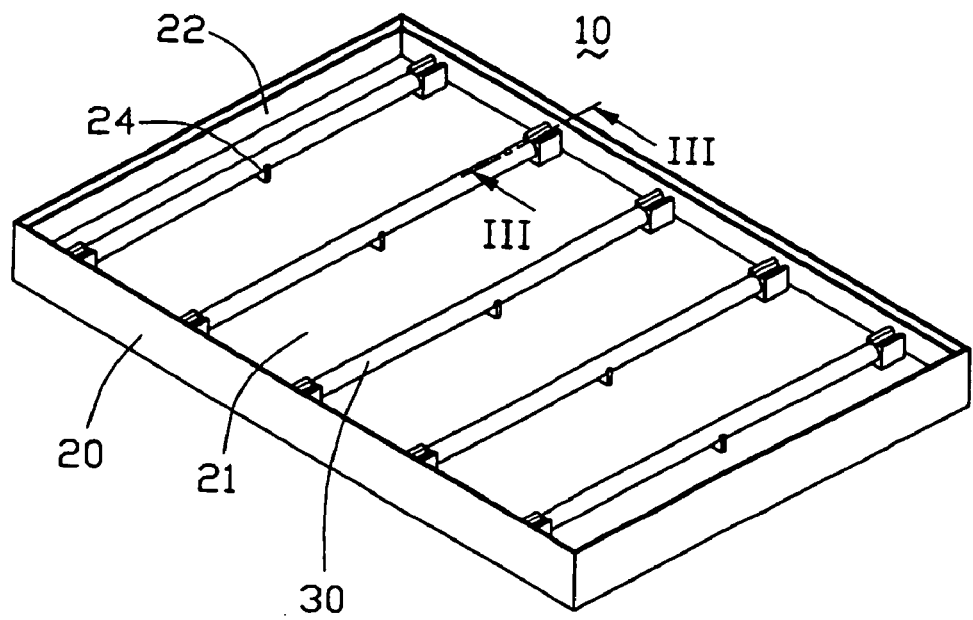
FIG. 2 is an assembled view of the backlight system of FIG. 1.
Figure 3:
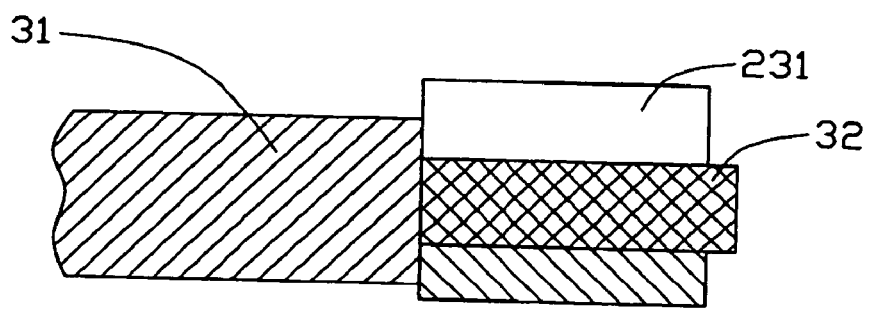
FIG. 3 is a cross-sectional view taken along line III—III of FIG. 2.

Referring to FIGS. 1–3, a backlight system 10 according to the preferred embodiment of the present invention includes a bracket 20 and a plurality of linear light sources 30. In the preferred embodiment, the linear light sources 30 are CCFLs (cold cathode fluorescent lamps), each of which has a diameter of about 2~3 mm.

Each CCFL 30 includes a light emitting portion 31, and a pair of wires 32 protruding from opposite ends of the emitting portion 31 respectively.

The bracket 20 includes a bottom plate 21, and four side plates 22 extending from four edges of the bottom plate 21 respectively. A plurality of elastic fixers 23 and fasteners 24 is disposed on the bottom plate 21. The fixers 23 line two opposite long sides of the bracket 20. The fasteners 24 are aligned along a middle of the bracket 20, between corresponding fixers 23. The fixers 23 can be made of silicon rubber or another elastic material with good heat-resistant [and heat transmission] characteristics. Each fixer 23 defines a groove 231. The fasteners 24 can be made of transparent elastic material. Each fastener 24 comprises an upper fastening portion 241.

In assembly, each CCFL 30 is pressed into the grooves 231 of two corresponding fixers 23 and the fastening portion 241 of a corresponding fastener 24. The grooves 231 of the corresponding fixers 23 have a diameter matching that of the wires 32 of the CCFL 30. The fastening portion 241 of the fastener 24 has a diameter matching that of the light emitting portion 31 of the CCFL 30. Therefore, the grooves 231 of the fixers 23 and the fastening portion 241 of the fastener 24 cooperative tightly fasten the CCFL 30 in the bracket 20.

When the CCFLs 30 are engaged in the bracket 20, the wires 32 are electrically connected to electronic means (not shown) provided in the bracket 20. Then external power can be supplied through the electronic means so that the light emitting portions 31 of the CCFLs 30 emit light beams. For improving the brightness of the backlight system 10, a reflective film 25 can be coated on the bottom plate 21 and side plates 22. The reflective film 25 can be made of an alloy or metallic material with high reflectivity.

When exchanging one of the CCFLs 30, the wires 32 and the light emitting portion 31 are removed from the fixers 23 and the fastener 24 respectively. Therefore, not only are the CCFLs 30 stably fixable in the bracket 20, they are also conveniently exchanged.

Figure 4:
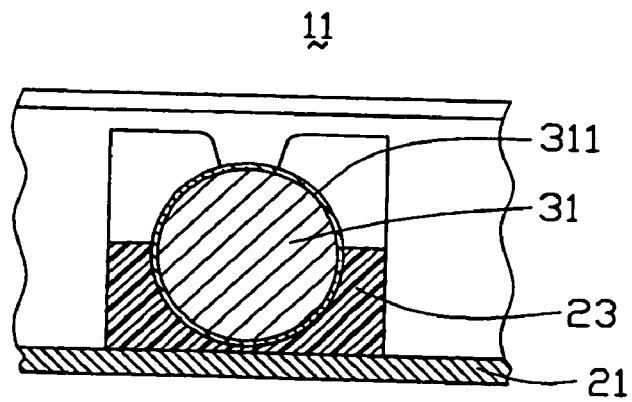
FIG. 4 is a cross-sectional view of part of a backlight system in accordance with an alternative embodiment of the present invention.

FIG. 4 is a cross-sectional view of part of a backlight system according to the alternative embodiment of the present invention. Unlike in the preferred embodiment, the light emitting portion 31 of each CCFL 30 is covered with a protective layer 311. The protective layer 311 can be made from stiff transparent material, and is used to protect the CCFL 30 from damage during transportation and during engagement of the CCFL 30 in the bracket 20.

Figure 5:
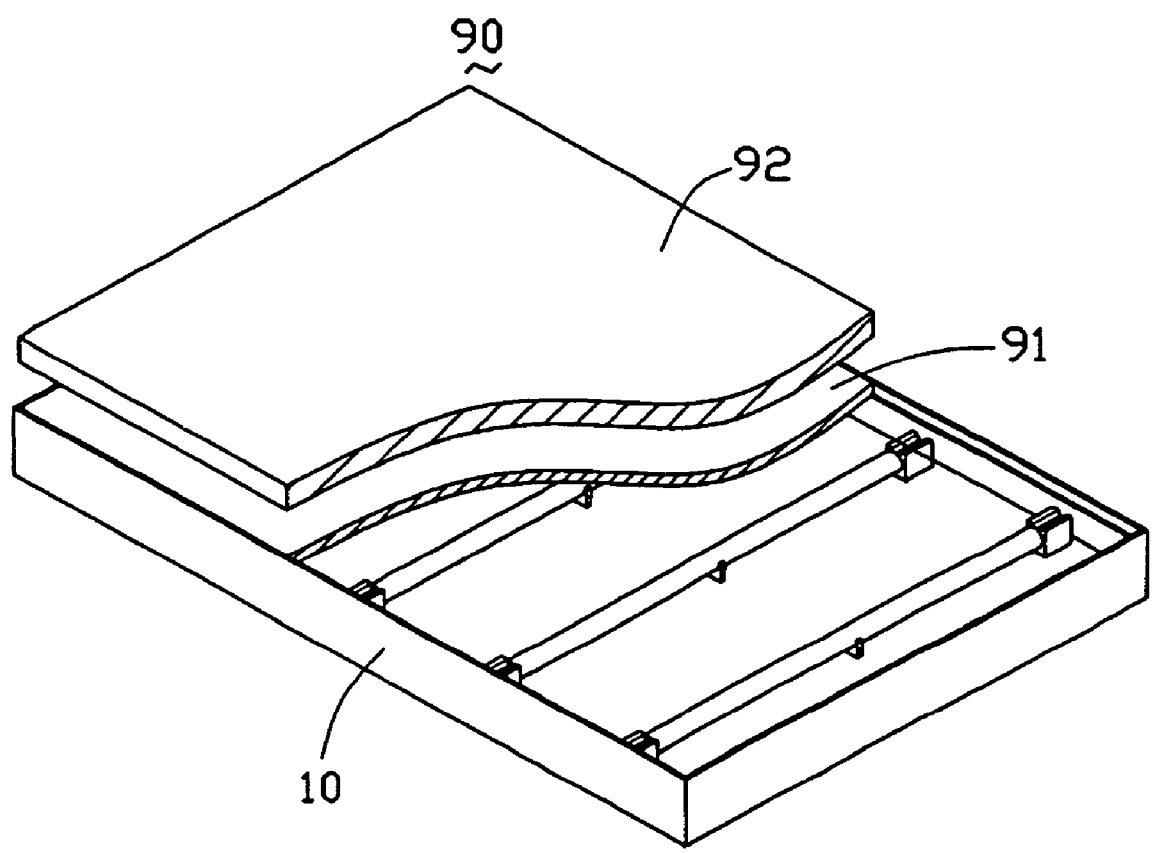
FIG. 5 is a partially cut-away, isometric view of a liquid crystal display using the backlight system of FIG. 2.
Figure 6:
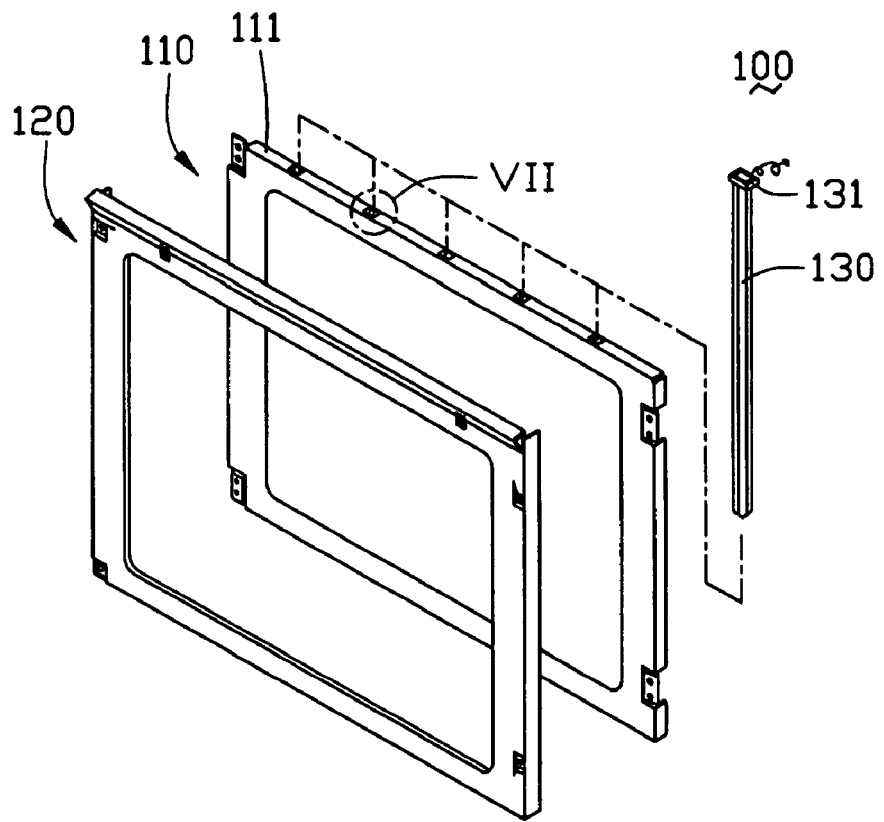
FIG. 6 is an exploded, isometric view of a conventional backlight system, but showing only one light source thereof.
Figure 7:
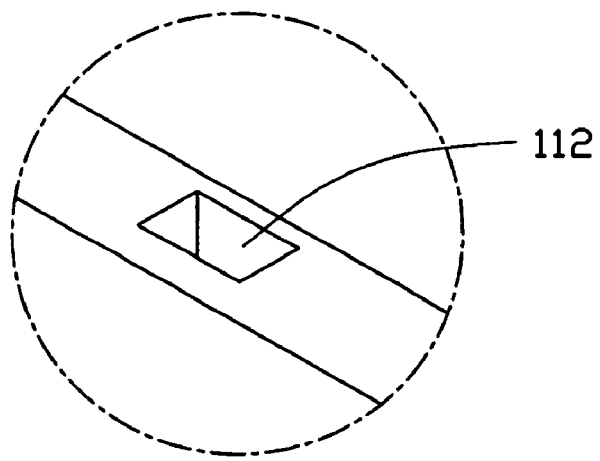
FIG. 7 is an enlarged view of a circled portion VII of FIG. 6.

FIG. 5 is a partially cut-away, isometric view of a liquid crystal display 90 using the backlight system 10 of the present invention. The liquid crystal display 90 includes a diffusion sheet 91 and a liquid crystal display panel 92 stacked in that order on the backlight system 10. In operation, light beams emitted from the backlight system 10 pass through the diffusion sheet 91 to illuminate the liquid crystal panel 92.

In summary, the main advantages of the present invention include following. First, the fixers 23 and the fastener 24 of the backlight system 10, 11 stably fix the light sources 30 in the bracket 20. Second, it is convenient and safe to exchange the light sources 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight system, comprising:
   a light source, defining a light emitting portion and a first wire; and
   a bracket comprising a fastening means which holds the light emitting portion thereby mounting the light source on the bracket, the wire being electrically connected with the bracket, the fastening means being made of transparent elastic material.

2. The backlight system as claimed in claim 1, wherein the light source further defines a second wire, and the two wires are at opposite ends of the light emitting portion.

3. The backlight system as claimed in claim 1, wherein the bracket further comprises a bottom plate.

4. The backlight system as claimed in claim 3, wherein the bottom plate has a reflective film provided thereon.

5. The backlight system as claimed in claim 1, wherein the light emitting portion is covered by a protective layer.

6. The backlight system as claimed in claim 5, wherein the protective layer is made of stiff transparent material.

7. A liquid crystal display, comprising:
   a liquid crystal display panel;
   a diffusion sheet underlying the liquid crystal display panel; and
   a backlight system underlying the diffusion sheet, the backlight system including:
   a light source, defining a wire, and a light emitting portion which is covered by a protective layer; and
   a bracket including a fastening means which holds the light emitting portion thereby mounting the light source on the bracket, the wire being electrically connected with the bracket, the fastening means being made of transparent elastic material.

8. The liquid crystal display as claimed in claim 7, wherein the light source further defines a second wire, and the two wires are at opposite ends of the light emitting portion.

9. The liquid crystal display as claimed in claim 7, wherein the bracket further comprises a bottom plate.

10. The liquid crystal display as claimed in claim 9, wherein the bottom plate has a reflective film provided thereon.

11. A backlight system, comprising:
    a light source, defining a light emitting portion and a wire at one end of the light emitting portion, the light emitting portion covered by a protection layer; and
    a bracket comprising a fastening means which holds the light emitting portion, and a fixer which is spaced from the fastening means and which holds the wire;
    wherein the light source is mounted to the bracket in a direction perpendicular to an axis defined by said light emitting portion, and the fastening means is made of transparent elastic material.

* * * * *